United States Patent [19]

Saurenman

[11] 4,282,830

[45] Aug. 11, 1981

[54] ION DISPENSER USABLE FOR TREATING POULTRY OR ANIMAL ZONES

[75] Inventor: Donald G. Saurenman, Whittier, Calif.

[73] Assignee: Consan Pacific Incorporated, Whittier, Calif.

[21] Appl. No.: 124,242

[22] Filed: Feb. 25, 1980

[51] Int. Cl.³ .............................................. A01K 31/00
[52] U.S. Cl. .................................................... 119/21
[58] Field of Search .................. 119/21; 361/229, 230, 361/231; 313/309

[56] References Cited

U.S. PATENT DOCUMENTS

| | | | |
|---|---|---|---|
| 3,137,806 | 6/1964 | Schweriner | 361/230 |
| 3,649,830 | 3/1972 | Sato et al. | 361/229 |
| 3,696,791 | 10/1972 | Saurenman et al. | 119/21 |
| 3,746,924 | 7/1973 | Testone | 361/230 |

Primary Examiner—Hugh R. Chamblee
Attorney, Agent, or Firm—William W. Haefliger

[57] ABSTRACT

Ion dispensing apparatus comprises (a) a cable including an elongated and sidewardly penetratable metallic core to which voltage is applicable, the cable including a protective sleeve of insulating material on and extending along and about the core, the sleeve defining a wall, (b) and needles having shanks penetrating through said sleeve wall and into the core to make electrical contact therewith so as to receive application of said voltage, the needles having tips openly exposed outwardly of the cable to dispense ions into the atmosphere near the cable.

5 Claims, 5 Drawing Figures ns, and results in improved growth rates and weight factors. In addition, negative ions in the atmosphere are cidal to micro-organisms including those that induce generation of ammonia gas, and there is also found to be a reduction of detectable ammonia in the atmosphere by virtue of the presence of artificially produced air ions. Further, the need for ventilation and heating of blown air is reduced, with cost savings. In addition, there is a consequent reduction in condemnation of animals (as for example poultry) procured for the market due to lesser disease incidence. In the feeding enclosures, nervousness is reduced and food conversion ratios are improved.

ION DISPENSER USABLE FOR TREATING POULTRY OR ANIMAL ZONES

BACKGROUND OF THE INVENTION

This invention relates generally to treatment of animals, and more particularly concerns the enhancement of animal growth through reduction in air-borne particulate and ammonia gas and odors in feeding enclosures.

The feeding areas of animals, as for example, poultry (chicken, Turkey, ducks, etc.) are typically dusty due to the stirring up of dusty litter or droppings and feed particles. As a result, fowl become nervous or irritated as indicated by increased fluttering, they tend to consume less feed, lay fewer eggs and add less weight, creating an economic loss. Animals other than fowl are also affected in a similar manner.

This condition is further aggravated by the production of ammonia gas and odors formed by the action of micro-organisms on droppings and in litter on the floor, as well as dampness. At 15 p.p.m. ammonia gas in the air can be detected by humans; at 50 p.p.m. such gas becomes detrimental to poultry health; and the gas becomes toxic at 100 p.p.m. Ammonia gas concentration around poultry enclosures is often so high that it will cause tear production in human eyes. Many poultry houses are provided with air blowers to furnish up to 7 c.f.m. of moving air in order to keep the ammonia gas and odor level down. This involves considerable expense for blowers and their operation, as well as added heating of such blown air drawn from the outside during cold weather. While poultry is specifically mentioned, it will be understood that animals other than poultry are similarly affected.

One method and means to overcome the above problem is disclosed in U.S. Pat. No. 3,696,791. While of unusual advantage, the manufacturing and installation time and cost of the disclosed ion dispensing means is higher than desirable.

SUMMARY OF THE INVENTION

It is a major object of the invention to provide method and apparatus for alleviating the above problems, and employing novel apparatus including needles carried by a cable, so that animal health and weight and production may be substantially improved.

Basically, the apparatus of the invention comprises:

(a) a cable including an elongated and sidewardly penetratable metallic core to which voltage is applicable, the cable including a protective sleeve of insulating material on and extending along and about the core, the sleeve defining a wall, (b) and needles having shanks penetrating through said sleeve wall and into the core to make electrical contact therewith so as to receive application of said voltage, the needles having tips openly exposed outwardly of the cable to dispense ions into the atmosphere near the cable.

Such apparatus is easily and readily fabricated, and thereafter installed, in an animal confining zone, so as to disperse ions into the animal feeding areas, with ion density and polarity to induce collection of air-borne dust and contaminants on particle collecting surfaces. Such particles, when charged negatively for example, settle much faster due to the positive earth charge acting on the collecting surfaces; and the consequent reduction of air-borne particulate including micro-organisms improves animal health, reduces respiratory problems, and results in improved growth rates and weight factors. In addition, negative ions in the atmosphere are cidal to micro-organisms including those that induce generation of ammonia gas, and there is also found to be a reduction of detectable ammonia in the atmosphere by virtue of the presence of artificially produced air ions. Further, the need for ventilation and heating of blown air is reduced, with cost savings. In addition, there is a consequent reduction in condemnation of animals (as for example poultry) procured for the market due to lesser disease incidence. In the feeding enclosures, nervousness is reduced and food conversion ratios are improved.

As will be seen, the needles may penetrate through the core, or merely into the core; the needle tips may be in or out of alignment lengthwise of the cable; and the cable may simply be tie-connected to beams at the upper interior of the zone, for rapid installation. Also, multiple cables may be strung about an animal enclosure, and supplied with high voltage from a single source, for maximum ion dispensing effect.

These and other objects and advantages of the invention, as well as the details of an illustrative embodiment, will be more fully understood from the following description and drawings, in which:

DRAWING DESCRIPTION

DETAILED DESCRIPTION

Figure 1:
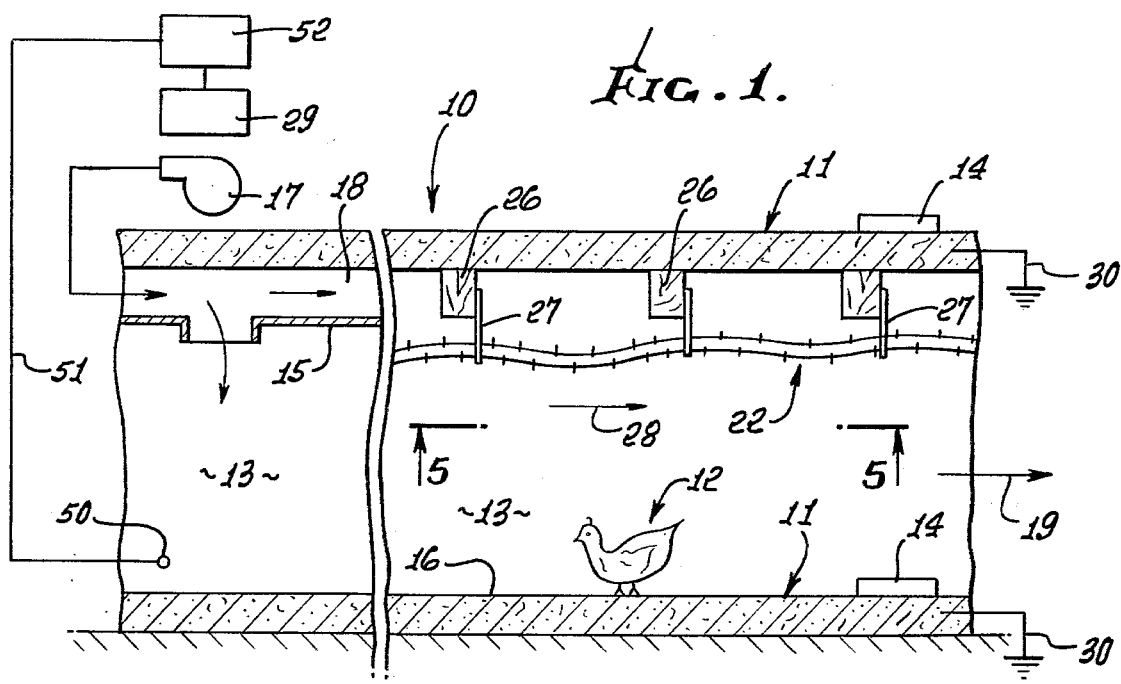
FIG. 1 is a side elevation of a poultry (or other animal) enclosure.

In the drawing, a poultry enclosure 10 contains decks 11 between which growing poultry 12 are kept in feeding zones 13, with access to feed in containers 14. This particular arrangement is illustrative only, and many different enclosures and feeding systems may be used, and for animals other than poultry.

The feeding zones characteristically contain airborne particulate matter, and there are particle collecting surfaces as at 15 and 16 exposed to the zone interiors. As stated, the presence of such air-borne particulate matter, stirred by movement of the poultry (or other animals) and by moving air, is hazardous and inhibits poultry growth and production. In this regard, ammonia gas and odor generated by droppings and urine is a further health hazard, and air blower 17 is operative to displace air currents via overhead ducting 18 into the zones 13 in an effort to remove such gas from zones 13; however, such flowing air stirs up dust particles as may originate from the environment and in the feed, further aggravating that source of irritation. Air streams leaving the enclosure via suitable outlets are indicated at 19.

Figure 2:
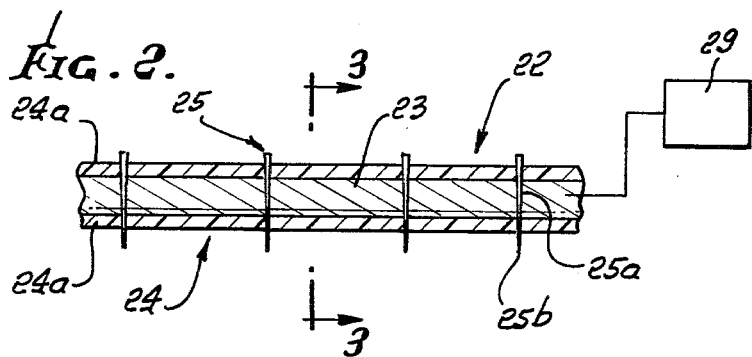
FIG. 2 is a section, in side elevation, showing an ion dispensing cable incorporating the invention.
Figure 3:
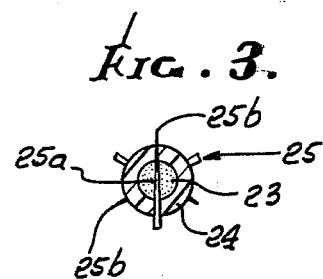
FIG. 3 is a section on lines 3—3 of FIG. 2.

In accordance with the invention, ions are dispensed into the zones 13 and with density and polarity to induce collection of the air-borne particles on the collecting surfaces. In addition, the dispensing step may be carried out to travel the ions into contact with air-borne micro-organisms and droppings or contaminants in the zone, thereby to inhibit ammonia generation and diffusion. Means to dispense ions may advantageously comprise one or more cables, indicated at 22, and each including an enlongated and sidewardly penetratable metallic core 23 to which voltage is applicable. As seen in FIGS. 2 and 3, the core may consist of 18-22 gage strands of copper or aluminum, or other electrically conductive material. The cable also includes a protective sleeve 24 of insulative material on and extending about and along the core, the sleeve defining a wall or walls indicated at 24a at opposite sides of the core, in FIG. 2. The insulative sleeve may for example consist of polypropylene or polyethylene.

The ion dispensing apparatus also includes needles 25 having shanks 25a penetrating through the sleeve wall 24a and into the core to make electrical contact therewith, the needles typically consisting of electrically conductive material such as stainless steel, plated with copper or gold alloy. The needles, to which voltage is transmitted via the cable core have sharp tips 25b openly exposed outwardly of the cable to dispense ions into the atmosphere near the cable.

Figure 5:
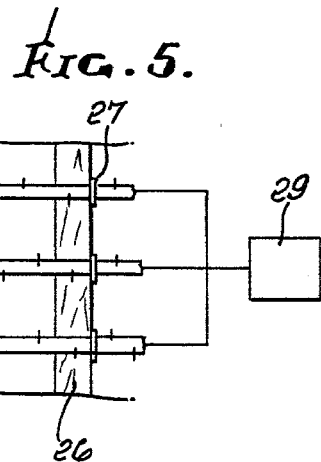
FIG. 5 is an upward looking plan view on lines 5—5 of FIG. 1.

In FIGS. 1 and 5, multiple cables 22 are suspended from beams 26 associated with enclosure 10, the cables typically extending in parallel relation. Ties 27 suspend the cables from the beams, and may consist of NYLON, for example, whereby the cables may readily be located to most effective use, in the upper interior of zone 13, in the paths of air streams 28 so that negative ions produced at the needle tips by corona effect are electrically repulsed and travel divergently outwardly into the air. One useful circuit to provide the voltage source 29 is described in U.S. Pat. No. 3,308,344. The decks 11 are typically grounded (i.e. made electrically positive) at 30, whereby negatively charged dust particles and micro-organisms are electrostatically attracted to deck surfaces.

Negative ions not only act to substantially reduce (by settling) the air-borne particulate matter including micro-organisms, but they also are believed to cause celia in the poultry breathing organs to operate efficiently thus causing the respiratory system to better filter out any particulate matter and micro-organisms remaining in the air. This also improves poultry (or animal) health.

As described in U.S. Pat. No. 3,696,791, an increase in poultry feeding to gain full size within six weeks rather than the normal eight weeks was achieved after use of the ion dispensing means and method described, with about 2,000 static volts maintained in the air at 13, all other conditions remaining the same before and after inclusion of the ion dispensers. Higher static volt levels, say up to 4,000 or 5,000 produce even better results in terms of rate of weight gain. Good results are obtainable with negative supply voltage between 500 and 18,000 or above. Another beneficial result is a reduction in the amount of the blown air needed to remove ammonia gas. It was also found that good results were obtained when voltage delivery to the needles, i.e., ion production, was intermittent, i.e., several time periods "on", several periods etc. "off", etc. It has been found that negative ions produce the best results but both negative and positive ions may be dispensed, with negative ions predominating.

Figure 4:
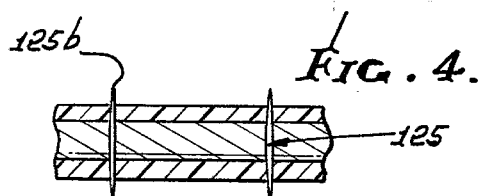
FIG. 4 is a view like FIG. 2, showing a modified cable.

It is clear from FIG. 3 that the needles may penetrate through the core and through both walls 24a of the sleeve 24 at opposite sides of the core; also, the needles may be out of alignment lengthwise of the cable, although some may be in alignment. Double ion dispensing effect is achieved by having the opposite exposed ends of each needle 125 define tips 125b, at opposite sides of the cable, as in FIG. 4. Typically, the needles 25 and 125 are located at intervals of between about 2 inches to several feet along the cable length; and the core is between about 3/16-½ inch in diameter. Thus, the flexible cable is adapted to be curved (as at 40 in FIG. 5) lengthwise to be strung about the zone 13 as desired.

FIG. 1 also shows a static voltage sensor 50 in zone 13, and connected in feed-back relation at 51 to a control device 52 for the voltage generator 29, and operating to control the voltage level or "on-off" or other output parameter of 29 so as to maintain desired static voltage level at 13.

Additional advantages of the invention include:
(1) reduced cost of materials;
(2) increased ion output due to needles not being enclosed;
(3) reduced cost of installation and maintenance, due to ease of cleaning of needles, as by a brush;
(4) random location of needles along and about a cable axis.

I claim:

1. In combination:
   (a) means forming an animal or poultry confinement zone which characteristically contains air-borne particles and animals waste, producing ammonia,
   (b) a flexible cable supported within said zone including a metallic core to which voltage is applicable, the cable including a protective sleeve of insulating material on and extending along and about the core, the sleeve defining a wall,
   (c) a plurality of spaced needles having shanks penetrating through said sleeve wall and into contact with the core to make electrical contact therewith so as to receive application of said voltage, the needles having tips openly exposed outwardly of the cable on different sides thereof to dispense ions into the atmosphere near the cable,
   (d) means openly suspending said cable in said zone, whereby said cable is bent to conform with a desired relation within said forming means to produce sufficient ions to suppress said particles and ammonia, and
   (e) means supplying sufficient voltage to said core to produce said sufficient ions.

2. The apparatus of claim 1 wherein the needles are out of linear alignment, lengthwise of the cable.

3. The combination of claim 1 wherein said zone forming means includes beams exposed to the upper interior of said zone, said cable suspended from said beams.

4. The combination of claim 1 including multiple of said cables suspended in the upper interior of said zone.

5. The combination of claim 3 including multiple cables suspended from said beams.

* * * * *